United States Patent
Hao

(10) Patent No.: US 11,188,116 B2
(45) Date of Patent: Nov. 30, 2021

(54) HARD DISK MONITORING SYSTEM AND MONITORING METHOD USING COMPLEX PROGRAMMABLE LOGIC DEVICE

(71) Applicant: Shenzhen Fugui Precision Ind. Co., Ltd., Shenzhen (CN)

(72) Inventor: Li-Yun Hao, Tianjin (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 287 days.

(21) Appl. No.: 16/358,019

(22) Filed: Mar. 19, 2019

(65) Prior Publication Data
US 2020/0241588 A1    Jul. 30, 2020

(30) Foreign Application Priority Data
Jan. 30, 2019  (CN) .......................... 201910093665.4

(51) Int. Cl.
  *G06F 1/08*    (2006.01)
  *G11B 20/10*   (2006.01)
(52) U.S. Cl.
  CPC .......... *G06F 1/08* (2013.01); *G11B 20/10009* (2013.01)
(58) Field of Classification Search
  CPC ............................... G06F 1/08; G11B 20/0009
  See application file for complete search history.

(56) References Cited

U.S. PATENT DOCUMENTS

| | | | |
|---|---|---|---|
| 6,178,056 B1* | 1/2001 | Cloke | G11B 20/10009 360/46 |
| 10,168,758 B2* | 1/2019 | Suryanarayanan | G06F 1/266 |
| 2003/0079106 A1* | 4/2003 | Yasuda | G11B 20/10527 711/220 |
| 2004/0111567 A1* | 6/2004 | Anderson | G06F 13/1626 711/149 |
| 2005/0289377 A1* | 12/2005 | Luong | G06F 1/324 713/322 |
| 2007/0077021 A1* | 4/2007 | Nakamura | H04N 9/7921 386/201 |
| 2009/0222707 A1* | 9/2009 | Shin | G06F 11/1004 714/758 |
| 2011/0175653 A1* | 7/2011 | Tani | G06F 11/0754 327/156 |
| 2014/0164678 A1* | 6/2014 | Lan | G06F 11/325 711/103 |
| 2019/0214075 A1* | 7/2019 | Chen | G06F 3/0673 |

* cited by examiner

*Primary Examiner* — Phil K Nguyen
(74) *Attorney, Agent, or Firm* — ScienBiziP, P.C.

(57) ABSTRACT

A method for monitoring working states of hard disks of a system of hard disks in a hard disk module includes a hard disk controller and a complex programmable logic device (CPLD). The hard disk controller and CPLD communicate with the hard disk module. The CPLD receives output signals from the hard disk controller and determines whether rise and fall changes in a clock signal of each output signal are steady. When a level change of the clock signal of one output signal is steady, the CPLD decodes the one output signal. When a level change of the clock signal of one output signal is not steady, the CPLD will stop decoding the one output signal. A related method is also provided.

12 Claims, 3 Drawing Sheets

HARD DISK MONITORING SYSTEM AND MONITORING METHOD USING COMPLEX PROGRAMMABLE LOGIC DEVICE

FIELD

The present disclosure relates to hard disk monitoring.

BACKGROUND

A complex programmable logic device (CPLD) can transmit data to a hard disk management controller and receive data from the hard disk management controller via a bus. A bus signal can include a clock signal and a data signal. The CPLD can receive data according to the clock signal and decode the received data for monitoring the working state of hard disks.

However, restarting of the system or other interruptions may cause a change of the clock signal to become not steady. Therefore, the received data may be invalid, causing errors in the decoding.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Description of specific embodiments of the present implementation will be described with reference to the accompanying drawings. The present implementation can be implemented in many ways different from those described herein, and those skilled in the art can make improvements without violating the terms of the present implementation. The present implementation is not to be considered as limiting the scope of the embodiments described herein.

Several definitions that apply throughout this disclosure will now be presented.

Unless otherwise defined, all technical and scientific terms used herein have the same meaning as commonly understood by one skilled in the art. The terms used in a specification of the present implementation herein are only for describing specific embodiments, and are not intended to limit the present implementation.

Figure 1:
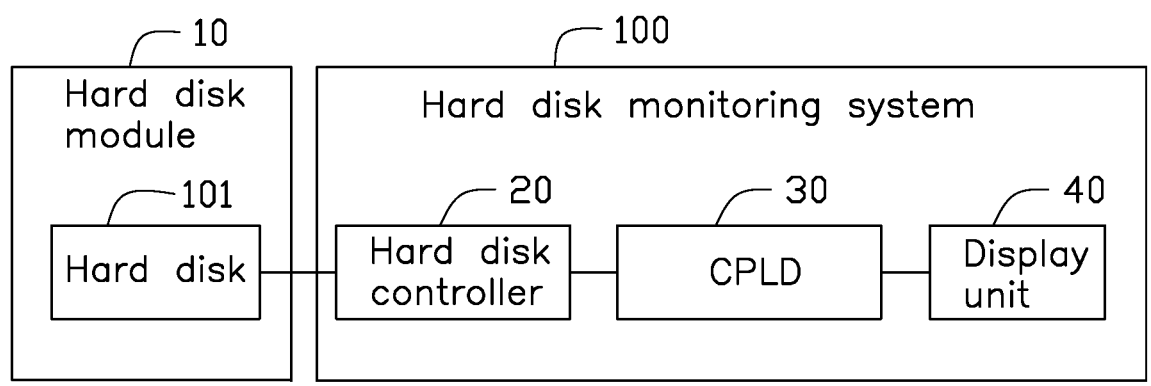
FIG. 1 is a block diagram of an embodiment of a hard disk monitoring system.

FIG. 1 shows an embodiment of a hard disk monitoring system. The hard disk monitoring system 100 can monitor a working state of a hard disk module 10. The hard disk monitoring system 100 can include a hard disk controller 20, a complex programmable logic device 30 (CPLD 30), and a display unit 40.

In a preferred embodiment, the hard disk module 10 includes at least one hard disk 101. The hard disk controller 20 enables communications between the hard disk module 10 and the CPLD 30. In detail, the hard disk controller 20 can be a platform controller hub (PCH). The CPLD 30 can enable communications between the hard disk controller 20 and the display unit 40.

The hard disk controller 20 can be configured to obtain a signal as to the state of each hard disk 101 of the hard disk module 10 in real time, to generate an output signal accordingly, and transmit the output signals to the CPLD 30. Each output signal can include a clock signal and a data signal. Each data signal can include the signal as to the state of the hard disk 101 corresponding to the output signal.

In an embodiment, the communication channel between the hard disk controller 20 and the CPLD 30 can be by a serial general purpose input output bus (SGPIO bus). Each output signal from the hard disk controller 20 complies with SGPIO protocol. Each output signal can be a SGPIO signal. Each clock signal can be an SClock signal of the SGPIO signal, and each data signal can be an SLoad signal and SDataOut signal of the SGPIO signal.

In detail, the hard disk controller 20 transmits the data signal on a rising edge of the clock signal, and the CPLD 30 receives the data signal on a falling edge of the clock signal. Thus, a steady of a level change (from rising to falling in that order) of the clock signal can determine a validity of the data signal received by the CPLD 30.

The CPLD 30 can determine whether the level change of clock signal is steady in the aforementioned way, and determine whether to decode the output signal according to result of determination.

When the result of determination is that the level change of the clock signal of one output signal is deemed steady, the CPLD 30 decodes the one output signal and controls the display unit 40 to display information as to the state of a hard disk 101 corresponding to the one output signal.

When the result of determination is that the level change of the clock signal of one output signal is deemed not steady, the CPLD 30 does not decode the one output signal.

Figure 2:
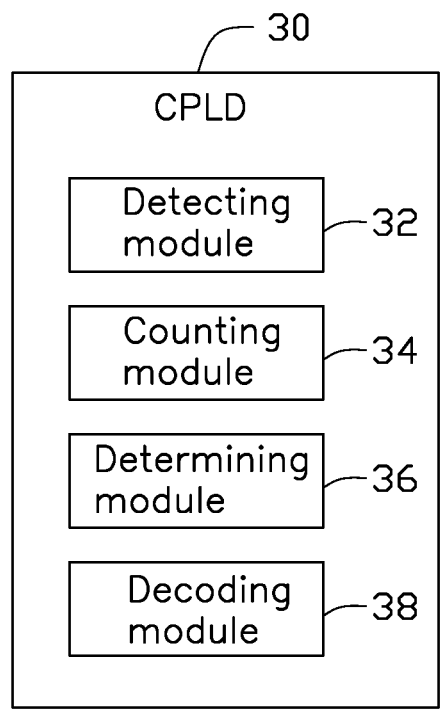
FIG. 2 is a block diagram of an embodiment of a complex programmable logic device (CPLD).

Further referring to FIG. 2, the CPLD 30 includes a detecting module 32, a counting module 34, a determining module 36, and a decoding module 38.

The detecting module 32 receives the output signals, determines whether the clock signal of each output signal changes in a preset frequency within a preset time interval, for example whether the clock signal of each output signal changes from a high level to a low level (falling) or changes from a low level to a high level (rising), and transmits to the counting module 34 a result for each output signal.

The counting module 34 counts the results in relation to the clock signals to obtain the number of changes and the number of no changes, and transmits a result of countings to the determining module. In detail, the counting module 34 can set a number of first counts and a number of second counts. An initial value of each first count and initial value of each second count each can be zero for example. Each first count corresponding to one second count and corresponding to one output signal. Each second count corresponding to one output signal.

When the clock signal of one output signal changes, the counting module 34 resets the value of the second count to the initial value, increases the value of the first count accordingly, for example increase of one, and transmits the value of the first count to the determining module 36.

The determining module 36 can determine whether the value of the first count is equal to or greater than a first predetermined value.

When the value of the first count is less than the first predetermined value, the detecting module 32 can continue to determine whether the clock signal of the one output signal changes in the preset frequency within the preset time interval.

When the value of the first count is equal to or greater than the first predetermined value within the preset time interval, namely the level changes of the clock signal are up to that point steady, at the decoding moment the decoding module 38 is configured to decode the one output signal, and control the display unit 40 to display the state of the hard disk 101 corresponding to the one output signal according to the decoded output signal.

The value of the first cumulative count being equal to or greater than the first predetermined value represents that the clock signal change of the one output signal is always steady.

When the clock signal of one output signal does not change, the counting module 34 increases the value of the second count, for example increase of one, and transmits the value of the second count to the determining module 36.

The determining module 36 determines whether the value of the second count is equal to or greater than a second predetermined value.

When the value of the second count is less than the second predetermined value, the detecting module 32 can continue to determine whether the clock signal of the one output signal changes in the preset frequency within the preset time interval.

When the value of the second count is equal to or greater than the second predetermined value within the preset time interval, at the decoding moment the decoding module 38 can stop decoding the one output signal, and the counting module 34 can reset the value of the first count corresponding to the one output signal to the initial value.

If the value of the cumulative second count increases to be equal to or greater than the second predetermined value from the initial value, this represents that the clock signal of the one output signal does not change, and that the level change of the clock signal of the one output signal is not steady.

The CPLD 30 will only decode one output signal when it is determined that the level change of the clock signal of the one output signal is steady. Thus, the hard disk monitoring system 100 prevents decoding of erroneous received data, caused or induced by a restarting of the system or other interruptions.

Figure 3:
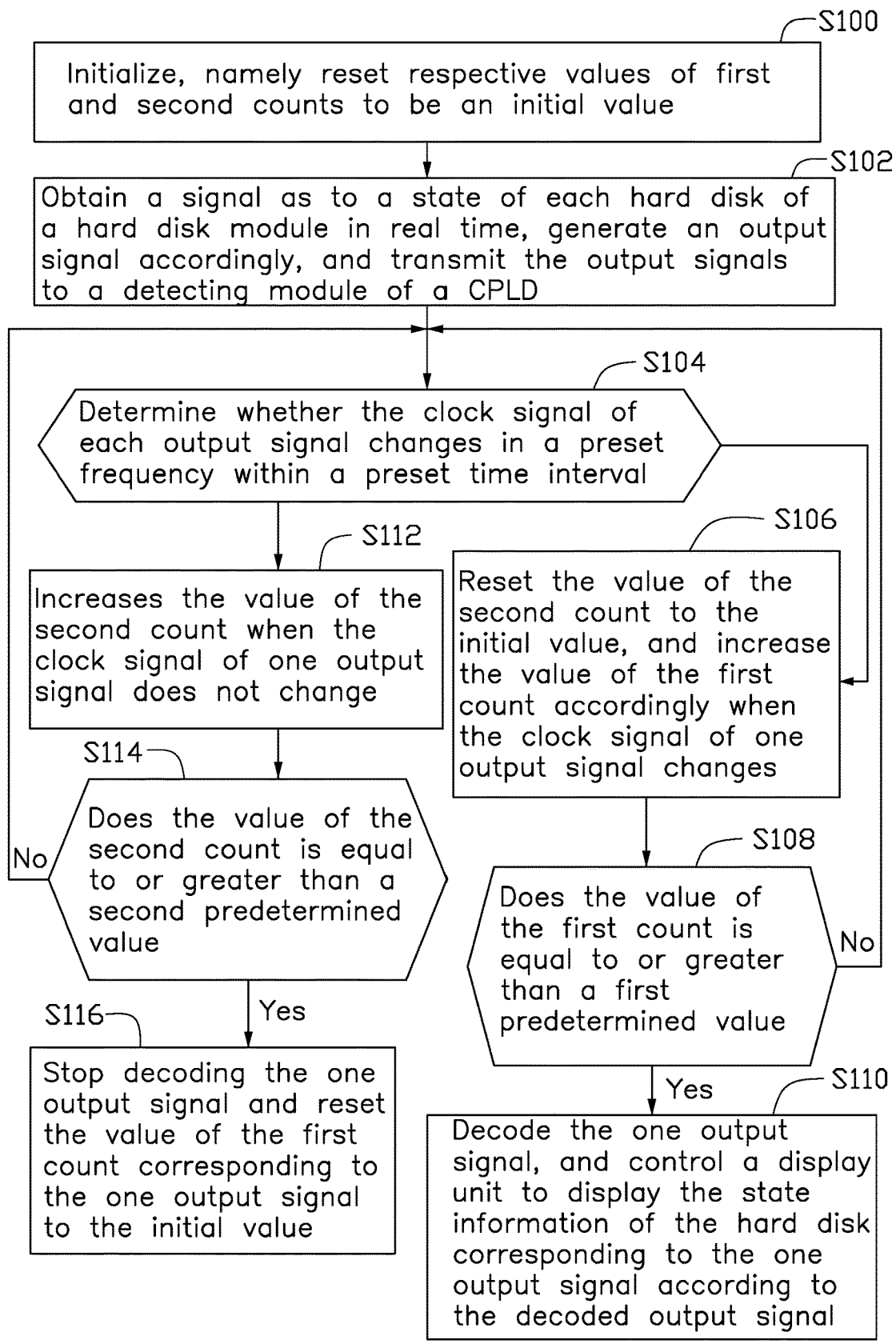
FIG. 3 is a flowchart of an embodiment of a hard disk monitoring method.

FIG. 3 shows a flowchart of a method for hard disk monitoring.

In step S100, a hard disk monitoring system 100 can initialize, namely reset respective values of first and second counts to be an initial value. For example, the initial value can be zero.

In step S102, a hard disk controller 20 can obtain a signal as to the state of each hard disk 101 of the hard disk module 10 in real time, generate an output signal accordingly, and transmit the output signals to the detecting module 32 of the CPLD 30. Each output signal can include a clock signal and a data signal. Each data signal can include the signal as to the state of the hard disk 101 corresponding to the output signal.

In an embodiment, the communication channel between the hard disk controller 20 and the CPLD 30 can be by a serial general purpose input output bus (SGPIO bus). Each output signal complies with SGPIO protocol. Each output signal can be a SGPIO signal. Each clock signal can be an SClock signal of the SGPIO signal, and each data signal can be an SLoad signal and SDataOut signal of the SGPIO signal.

In step S104, the detecting module 32 can determine whether the clock signal of each output signal changes in a preset frequency within a preset time interval, for example whether each clock signal changes from a high level (falling) to a low level or changes from a low level to a high level (rising), and transmit a result for the clock signal of each output signal to the counting module 34. When the clock signal of one output signal changes from the high level to the low level or change from the low level to the high level, the procedure goes to step S106. When the clock signal of one output signal does not change from the high level to the low level and does not change from the low level to the high level, the procedure goes to step S112.

In step S106, the counting module 34 resets the value of the second count to the initial value, increases the value of the first count accordingly, for example increase of one, and transmits the value of the first count to the determining module 36.

In step S108, the determining module 36 determines whether the value of the first count is equal to or greater than a first predetermined value. When the value of the first count is equal to or greater than the first predetermined value, the procedure goes to step S110. When the value of the first count is less than the first predetermined value, the procedure goes to step S104 to continue to determine whether the clock signal of the one output signal changes in the preset frequency within the preset time interval.

In step S110, the decoding module 38 can decode the one output signal, and control the display unit 40 to display the state information of the hard disk 101 corresponding to the one output signal according to the decoded output signal.

The value of the first cumulative count being equal to or greater than the first predetermined value, this represents that the clock signal change of the one output signal is always steady.

In step S112, the counting module 34 increases the value of the second count, for example increase of one, and transmits the value of the second count to the determining module 36.

In step S114, the determining module 36 determines whether the value of the second count is equal to or greater than a second predetermined value. When the value of the second count is equal to or greater than the second predetermined value, the procedure goes to step S116. When the value of the second count is less than the second predetermined value, the procedure goes to step S104 to continue to determine whether the clock signal of the one output signal changes in the preset frequency within the preset time interval.

In step S116, the decoding module 38 stops decoding the one output signal, and the counting module 34 resets the value of the first count corresponding to the one output signal to the initial value.

If the value of the cumulative second count increases to be equal to or greater than the second predetermined value from the initial value, this represents that the clock signal of the one output signal does not change, and that the level change of the clock signal of the one output signal is not steady.

The aforementioned hard disk monitoring system 100 and hard disk monitoring method will only decode one output signal when it is determined that the level change of the clock signal of the one output signal is steady by the CPLD 30, thus avoiding the wrong decoding.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A hard disk monitoring system configured to monitor a working state of at least one hard disk of a hard disk module, the hard disk monitoring system comprising:
   a hard disk controller enabling communications between the hard disk module, the hard disk controller obtaining a signal as to the state of each of the hard disks of the hard disk module in real time and generating an output signal accordingly; and
   a complex programmable logic device (CPLD) enabling communications between the hard disk controller, the CPLD being configured to receive at least one output signal from the hard disk controller and determine whether a level change of a clock signal of the at least one output signal is steady, wherein:
   when the level change of the clock signal of one output signal of the at least one output signal is steady, the CPLD is configured to decode the one output signal;
   when the level change of the clock signal of one output signal of the at least one output signal is not steady, the CPLD is configured to stop decoding the one output signal;
   the CPLD comprising a detecting module, a counting module, and a determining module, wherein:
   the detecting module is configured to receive the at least one output signal and determine whether the clock signal of the at least one output signal changes in a preset frequency within a preset time interval;
   the counting module is configured to increase a value of a first count and reset a value of a second count to be an initial value when the clock signal of one output signal of the at least one output signal changes;
   the determining module is configured to determine whether the value of the first count is equal to or greater than a first predetermined value;
   the determining module is configured to determine that the level change of the clock signal of the one output signal of the at least one output signal is steady when the value of the first count is equal to or greater than the first predetermined value.

2. The hard disk monitoring system of claim 1, wherein the detecting module is configured to continue to determine whether the clock signal of the one output signal of the at least one output signal changes in the preset frequency within the preset time interval when the value of the first count is less than the first predetermined value.

3. The hard disk monitoring system of claim 1, wherein:
   the counting module is configured to increase a value of a second count when the clock signal of one output signal of the at least one output signal does not change;
   the determining module is configured to determine whether the value of the second count is equal to or greater than a second predetermined value;
   the determining module is configured to determine that the level change of the clock signal of the one output signal of the at least one output signal is not steady and the counting module is configured to reset the value of the first count corresponding to the one output signal to be an initial value when the value of the second count is equal to or greater than the second predetermined value.

4. The hard disk monitoring system of claim 3, wherein:
   the detecting module is configured to continue to determine whether the clock signal of the one output signal of the at least one output signal changes in the preset frequency within the preset time interval when the value of the second count is less than the second predetermined value.

5. A hard disk monitoring system configured to monitor a working state of hard disks of a hard disk module, the hard disk monitoring system comprising:
   a hard disk controller enabling communications between the hard disk module; and
   a complex programmable logic device (CPLD) enabling communications between the hard disk controller, the CPLD being configured to receive at least one output signal from the hard disk controller and determine whether a level change of a clock signal of the at least one output signal is steady, wherein:
   when the level change of the clock signal of one output signal of the at least one output signal is steady, the CPLD is configured to decode the one output signal;
   when the level change of the clock signal of one output signal of the at least one output signal is not steady, the CPLD is configured to stop decoding the one output signal;
   the CPLD comprising a detecting module, a counting module and a determining module, wherein:
   the detecting module is configured to receive the at least one output signal and determine whether the clock signal of at least one output signal changes in a preset frequency within a preset time interval;
   the counting module is configured to increase a value of a first count and reset a value of a second count to be an initial value when the clock signal of one output signal of the at least one output signal changes;
   the determining module is configured to determine whether the value of the first count is equal to or greater than a first predetermined value;
   the determining module is configured to determine that the level change of the clock signal of the one output signal of the at least one output signal is steady when the value of the first count is equal to or greater than the first predetermined value.

6. The hard disk monitoring system of claim 5, wherein the detecting module is configured to continue to determine whether the clock signal of the one output signal of the at least one output signal changes in the preset frequency within the preset time interval when the value of the first count is less than the first predetermined value.

7. The hard disk monitoring system of claim 5, wherein:
   the counting module is configured to increase a value of a second count when the clock signal of one output signal of the at least one output signal does not change;
   the determining module is configured to determine whether the value of the second count is equal to or greater than a second predetermined value;
   the determining module is configured to determine that the level change of the clock signal of the one output signal of the at least one output signal is not steady and the counting module is configured to reset the value of the first count corresponding to the one output signal to be an initial value when the value of the second count is equal to or greater than the second predetermined value.

8. The hard disk monitoring system of claim 7, wherein:
   the detecting module is configured to continue to determine whether the clock signal of the one output signal of the at least one output signal changes in the preset frequency within the preset time interval when the value of the second count is less than the second predetermined value.

9. A hard disk monitoring method comprising:
obtaining at least one signal as to the state of at least one hard disks of a hard disk module in real time and generating at least one output signal accordingly by a hard disk controller;
receiving the at least one output signal from the hard disk controller;
determining whether a level change of a clock signal of the at least one output signal is steady;
decoding one output signal when the level change of the clock signal of the one output signal of the at least one output signal is steady;
stopping decoding one output signal when the level change of the clock signal of the one output signal of the at least one output signal is not steady;
the method of determining whether a level change of a clock signal of the at least one output signal is steady comprises:
determining whether the clock signal of the at least one output signal changes in a preset frequency within a preset time interval;
increasing a value of a first count and resetting a value of a second count to be an initial value when the clock signal of one output signal of the at least one output signal changes;
determining whether the value of the first count is equal to or greater than a first predetermined value;
determining that the level changes of the clock signal of the one output signal of the at least one output signal is steady when the value of the first count is equal to or greater than the first predetermined value.

10. The hard disk monitoring method of claim 9 further comprising:
continuing to determine whether the clock signal of the one output signal of the at least one output signal changes in the preset frequency within the preset time interval when the value of the first count is less than the first predetermined value.

11. The hard disk monitoring method of claim 9, wherein the method of determining whether a level change of a clock signal of the at least one output signal is steady further comprises:
increasing a value of a second count when the clock signal of one output signal of the at least one output signal does not change;
determining whether the value of the second count is equal to or greater than a second predetermined value;
determining that the level change of the clock signal of the one output signal of the at least one output signal is not steady and resetting the value of the first count corresponding to the one output signal to be an initial value when the value of the second count is equal to or greater than the second predetermined value.

12. The hard disk monitoring method of claim 11, further comprising:
continuing to determine whether the clock signal of the one output signal of the at least one output signal changes in the preset frequency within the preset time interval when the value of the second count is less than the second predetermined value.

* * * * *